UNITED STATES PATENT OFFICE.

OTTO BRAUN, OF BERLIN, PRUSSIA.

IMPROVEMENT IN TREATING WOOL, &c., TO FREE THEM FROM IMPURITIES.

Specification forming part of Letters Patent No. 163,729, dated May 25, 1875; application filed April 12, 1875.

*To all whom it may concern:*

Be it known that I, OTTO BRAUN, of Berlin, Prussia, have invented a certain new and useful Improvement in Treating Wool, Fruits, and other Substances with Ether, of which the following is a specification:

My invention consists in a peculiar process of treating wool, fruits, and other substances with ether, by first immersing the wool or other substance in water, then displacing the water absorbed by said substance by means of an intermediate liquid, which intermediate liquid is finally displaced by the ether.

In order to free wool or other substances from such impurities which are soluble in water, such, for instance, as earthy matters or sweat, and also from such impurities which are insoluble in water, but soluble in ether, I first immerse the wool or other substance in water, and after the impurities soluble in water have been absorbed by the water, I place the wool or other substance trickling wet into a vessel provided with a false perforated bottom, and with a perforated follower, and then I apply pressure to the follower, and, after closing the vessel, I allow a liquid to enter which is soluble in ether as well as in water, such, for instance, as alcohol. This liquid I term the intermediate liquid. If this intermediate liquid is lighter than water, I allow it to enter from below; if it is heavier, I introduce it from above. By this intermediate liquid the water is displaced from the wool or other substance. Then I introduce the ether, which, in its turn, displaces the intermediate liquid, being allowed to enter from above.

By the action of the ether all impurities contained in the wool or other substance which are soluble in ether are dissolved and carried off in the ether discharging from the vessel containing the wool or other substance. When the ether flows from said vessel in a pure state, the operation may be considered as completed.

For the purpose of regaining the intermediate liquid, such as alcohol, by separating the same from the impurities absorbed by the same, and also of the ether, I subject the solutions which contain water, ether, fatty matters, and also the intermediate liquid and the impurities dissolved therein, to a process of distillation and redistillation and rectification in any apparatus suitable for this purpose.

When substances are to be treated which require no previous treatment with water, it is not necessary to apply any intermediate liquid, the ether adhering to the substance under treatment being displaced by water entering from below.

The separation of the various liquids may be effected either in one or in several distilling apparatus, so that a mixture of only two different liquids is introduced into each still. In all cases the impurities dissolved in the ether remain in the still.

What I claim as new, and desire to secure by Letters Patent, is—

The process of treating wool, &c., to free them from impurities by first immersing them in water to remove impurities soluble in water, then displacing the water by an intermediate liquid capable of dissolving the impurities insoluble in water, and, finally, displacing the intermediate liquid by means of ether, which will dissolve the impurities insoluble in alcohol and water, substantially as and for the purposes set forth.

In testimony that I claim the foregoing I have hereunto set my hand this 8th day of January, 1875.

DR. OTTO BRAUN.

Witnesses:
H. KREISMANN,
BERTHOLD ROI.